May 12, 1953 — J. R. PIERCE — 2,638,502

SOLENOID DELAY LINE

Filed March 14, 1951

INVENTOR
J. R. PIERCE
BY Hugh S. Wertz
ATTORNEY

Patented May 12, 1953 2,638,502

UNITED STATES PATENT OFFICE 2,638,502

SOLENOID DELAY LINE

John R. Pierce, Berkeley Heights, N. J., assignor to Bell Telephone Laboratories, Incorporated, New York, N. Y., a corporation of New York Application March 14, 1951, Serial No. 215,536

5 Claims. (Cl. 178—44)

This invention relates to delay lines and more particularly to solenoid delay lines.

The object of this invention is to provide a new and improved form of solenoid delay line.

A simple solenoid delay line consists essentially of a single layer of insulated wire wound around a core of insulating material over, or covered by, a grounded conductor. Since it is usually desirable that a delay line for use at high frequencies be shielded, it is customary to enclose the solenoid coil within a grounded conductor which serves as a shield. In such lines, the signals are supplied as an input to one end of the coil, and their delay is accomplished by storage both in the magnetic field of the coil and in the electrostatic field between the coil and the grounded shield. The delay should thus depend only on the two reactive parameters, the inductance and ground capacitance per unit length. It is found characteristic of such lines, however, that at low frequencies the velocity of an input wave is greater than the velocity at high frequencies. As a result, there is an increase of delay with increasing frequency. This effect is undesirable and limits the usefulness of such lines.

Accordingly it is another object of this invention to equalize the characteristics of such delay lines and provide a line of more uniform delay over a wide range of frequencies.

Various expedients can be adopted in such lines for making the phase velocity of an input wave more uniform at higher frequencies. For example, by moving the coil off center with respect to the surrounding shield, the low-frequency capacitance can be increased without substantially altering the low-frequency inductance, and thereby the low-frequency velocity is made more equal to the high-frequency velocity. Moreover, the low-frequency inductance can be increased without appreciable effect on the low-frequency capacitance by adding longitudinal grooved extensions along the surrounding shield, whereby improved equalization is realized. However, these expedients usually result in greater variation of attenuation and characteristic impedance with frequency than is desired.

By the practice of the present invention, there is obtained a delay line which is substantially uniform for a wide range of frequencies in attenuation, characteristic impedance, and phase velocity.

In accordance with the invention, the solenoid delay line comprises a solenoid having both inner and outer closed cylindrical conducting shields.

In particular, if the solenoid, and inner and outer conducting shields have radii of $r_2$, $r_1$, and $r_3$, respectively, the advantages of the present invention are most fully realized when the ratio $r_1/r_2$ is substantially equal to the ratio $r_2/r_3$.

Figure 1:
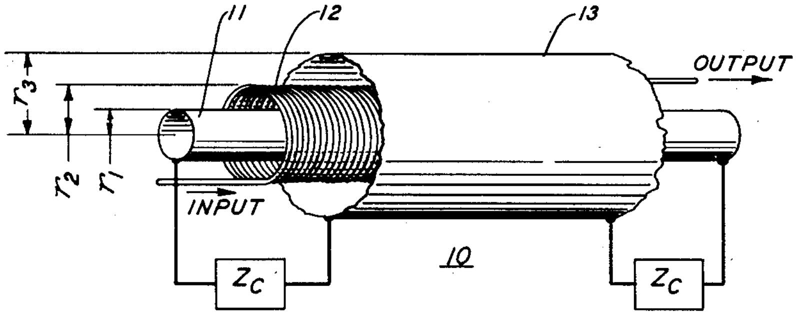
Figure 2A:
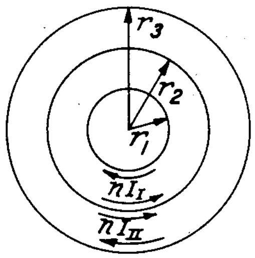
Figure 2B:
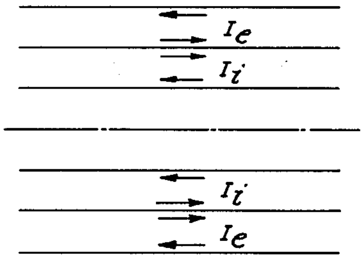

The invention will be better understood with reference to the following more detailed description taken in connection with the accompanying drawings in which:

Fig. 1 shows a portion of a delay line, in accordance with the preferred embodiment of the invention, which has been cut away at one end to show the various constituent layers; and Figs. 2A and 2B are diagrams which illustrate the circumferential and longitudinal currents, respectively in designated elements of the line of Fig. 1.

With reference more particularly to the section of delay line 10 shown in Fig. 1, the core is made up of an inner cylindrical conducting shield 11 having an outside radius $r_1$. About this shield is wound a wire to form a solenoid coil 12 of $n$ turns, concentric therewith and having a mean radius $r_2$. Enclosing and concentric with both the inner shield 11 and the coil 12 is the outer cylindrical conducting shield 13 having an inner radius $r_3$. To maintain the relative positions of the various elements, it is usually convenient to fill the interspaces with a dielectric medium having a permeability coefficient $\mu$ and dielectric coefficient $\epsilon$. Signals to be delayed are supplied as an input to one end of the coil 12, and the delayed signals are derived at the opposite end of the coil.

In the analysis of such a structure, it is evident that there are two components of magnetic flux. One is a circumferential component produced by the longitudinal component of current. Let I be the current in the coil, $I_e$ be the longitudinal component of current in the outer conductor, and $I_i$ be the longitudinal component of current in the inner conductor. The relative directions of each of these currents are shown in the diagram of Fig. 2B. Then $$I=I_i+I_e \qquad (1)$$

The magnitude of the circumferential flux between the coil 12 and the outer shield 13 is $$\psi_e=\int_{r_2}^{r_3}\frac{\mu I_e}{2\pi r}\,dr=\frac{\mu I_e}{2\pi}ln\left(\frac{r_3}{r_2}\right) \qquad (2)$$

where $\mu$ is the permeability of the interspace medium.

Similarly, the magnitude of the circumferential flux between the inner conductor 11 and the coil 12 is $$\psi_i=\frac{\mu I_i}{2\pi}ln\left(\frac{r_2}{r_1}\right) \qquad (3)$$

Since there should not be net flux linking the inner conductor, $$\psi_e=\psi_i \qquad (4)$$

$$I_e=I_i\frac{ln\left(\frac{r_2}{r_1}\right)}{ln\left(\frac{r_3}{r_2}\right)} \qquad (5)$$

$$I=I_i\left(1+\frac{ln\left(\frac{r_2}{r_1}\right)}{ln\left(\frac{r_3}{r_2}\right)}\right)=I_i\frac{ln\left(\frac{r_3}{r_1}\right)}{ln\left(\frac{r_3}{r_2}\right)} \qquad (6)$$

$$\psi_e=\frac{\mu I\, ln\left(\frac{r_3}{r_2}\right)ln\left(\frac{r_2}{r_1}\right)}{2\pi\, ln\left(\frac{r_3}{r_1}\right)} \qquad (7)$$

The corresponding flux linkage per ampere per meter is a component of inductance $L_e$ henries/meter $$L_e\frac{\mu\, ln\left(\frac{r_3}{r_2}\right)ln\left(\frac{r_2}{r_1}\right)}{2\pi\, ln\left(\frac{r_3}{r_1}\right)} \qquad (8)$$

There is also a longitudinal component of flux, which again must have the same magnitude inside and outside the coil. Let the ampere-turns per meter about the outside space be $nI_{II}$ and the ampere-turns per meter about the inside space be $nI_I$, where $n$ is the number of turns per meter in the coil and where $I_I$ and $I_{II}$ are the circumferential components of current flowing in the inner and outer shields, respectively, as illustrated in Fig. 2A. Then the magnitude of the flux between the coil 12 and the outer shield 13 is $$\psi_{II}=\mu nI_{II}\pi(r_3^2-r_2^2) \qquad (9)$$

and similarly the magnitude of the flux between the inner shield 11 and the coil 12 is $$\psi_I=\mu nI_I\pi(r_2^2-r_1^2) \qquad (10)$$

As these magnitudes must be the same $$\psi_{II}=\psi_I \qquad (11)$$

$$nI_I=nI_{II}\frac{(r_3^2-r_2^2)}{(r_2^2-r_1^2)} \qquad (12)$$

Since $$nI=nI_I+nI_{II} \qquad (13)$$

$$nI=nI_{II}\frac{(r_3^2-r_1^2)}{(r_2^2-r_1^2)} \qquad (14)$$

and $$\psi_{II}=nI\pi\mu\frac{(r_3^2-r_2^2)(r_2^2-r_1^2)}{(r_3^2-r_1^2)} \qquad (15)$$

The linkage per unit length per unit current in the coil is $n$ times $\psi_{II}$, corresponding to a component of inductance $L_c$ $$L_c=n^2\pi\mu\frac{(r_3^2-r_2^2)(r_2^2-r_1^2)}{(r_3^2-r_1^2} \qquad (16)$$

Now, if $\psi$ is the angle of pitch of the coil $$\frac{1}{n}=2\pi r_2\tan\psi \qquad (17)$$

$$n^2=\frac{\cot^2\psi}{4\pi^2r_2^2} \qquad (18)$$

$$L_c=\frac{\mu\cot^2\psi}{4\pi}\,\frac{(r_3^2-r_2^2)}{r_2^2}\,\frac{(r_2^2-r_1^2)}{(r_3^2-r_1^2} \qquad (19)$$

The total inductance per unit length, L, is $$L=L_e+L_c \qquad (20)$$

$$L=\frac{\mu}{2\pi}\left|\frac{ln\left(\frac{r_3}{r_2}\right)ln\left(\frac{r_2}{r_1}\right)}{ln\left(\frac{r_3}{r_1}\right)}+\frac{\cot^2\psi}{2}\,\frac{\left|\left(\frac{r_3}{r_2}\right)^2-1\right|\left|\left(\frac{r_2}{r_1}\right)^2-1\right|}{\left(\frac{r_3}{r_2}\right)^2-1}\right| \qquad (21)$$

The sum of the capacitances per meter between the coil and the inside and outside shields can be shown to be $$C=2\pi\epsilon\left|\frac{1}{ln\left(\frac{r_3}{r_2}\right)}+\frac{1}{ln\left(\frac{r_2}{r_1}\right)}\right| \qquad (22)$$

where $\epsilon$ is the dielectric constant of the interspace medium.

$$C=2\pi\epsilon\frac{ln\left(\frac{r_3}{r_1}\right)}{ln\left(\frac{r_3}{r_2}\right)ln\left(\frac{r_2}{r_1}\right)} \qquad (23)$$

The velocity of an input wave is $$v=\frac{1}{\sqrt{LC}}$$

$$v=\frac{1}{\sqrt{\mu\epsilon}}\left|1+\frac{\cot^2\psi\left|\left(\frac{r_3}{r_2}\right)^2-1\right|\left|\left(\frac{r_2}{r_1}\right)^2-1\right|ln\left(\frac{r_3}{r_1}\right)}{2\left|\left(\frac{r_3}{r_1}\right)^2-1\right|ln\frac{r_3}{r_2}\;ln\frac{r_2}{r_1}}\right|^{\frac{1}{2}} \qquad (24)$$

It will be convenient to examine this expression in term of phase constants. Let $$\beta=\frac{\omega}{v} \qquad (25)$$

$$\beta_0=\omega\sqrt{\mu\epsilon}=\frac{\omega}{v_0} \qquad (26)$$

where $\mu_0$, $\epsilon_0$, and $v_0$ are the permeability, dielectric constant, and velocity of a transverse electromagnetic wave in a space filled with a substance of permeability $\mu$ and dielectric constant $\epsilon$.

$$\beta^2=\beta_0^2\left|1+\frac{\cot^2\psi\left|\left(\frac{r_3}{r_2}\right)^2-1\right|\left|\left(\frac{r_2}{r_1}\right)-1\right|ln\left(\frac{r_3}{r_1}\right)}{2\left|\left(\frac{r_3}{r_1}\right)^2-1\right|ln\left(\frac{r_3}{r_2}\right)ln\left(\frac{r_2}{r_1}\right)}\right| \qquad (27)$$

Two cases warrant special attention. Suppose the case of the usual solenoid delay line which does not utilize an inner conducting shield, in which $r_1=0$, and in which also $$\left(\frac{r_3}{r_2}\right)^2=1+\delta$$

$$\delta<<1$$

Then to the first order in $\delta$ $$\beta^2\doteq\beta_0^2\left|1+\cot^2\psi\left(1-\frac{\delta}{2}\right)\right| \qquad (28)$$

$$\beta\doteq\beta_0[1+\cot^2\psi]^{1/2}\left|1-\frac{\delta\cot^2\psi}{4(1+\cot^2\psi)}\right| \qquad (29)$$

Now at very high frequencies, $$\beta\rightarrow\beta_0[1+\cot^2\psi]^{1/2} \qquad (30)$$

If F designates the fractional difference between the low frequency and high frequency values of $\beta$ $$F=-\frac{\delta \cos^2 \psi}{4} \qquad (31)$$

This also represents the fractional difference between the higher phase velocity at very low frequencies and the lower phase velocity at very high frequencies.

However, now suppose the case in accordance with the invention, in which there is provided both an inner and an outer shield so that $$\left(\frac{r_3}{r_2}\right)^2=\left(\frac{r_2}{r_1}\right)^2=1+\delta$$

Then the low frequency expression for $\beta$ becomes $$\beta=\beta_0\left|1+\cot^2 \psi\left(1-\frac{\delta^2}{4}\right)\right|^{\frac{1}{2}} \qquad (32)$$

or approximately $$\beta=\beta_0\left|1+\cot^2 \psi\right|^{\frac{1}{2}}\left|1-\frac{\delta^2 \cot^2 \psi}{8}\right| \qquad (33)$$

while the high frequency expression for $\beta$ is $$\beta=\beta_0|1+\cot^2 \psi|^{\frac{1}{2}} \qquad (34)$$

Now, the fractional difference between low frequency and high frequency expressions for $\beta$, in this case, is $$F=-\frac{\delta^2 \cos^2 \psi}{8} \qquad (35)$$

Here, although the phase velocity is still greater at low frequencies, than at high frequencies, it can be seen that for a given small value of $\delta$ the fractional difference in velocities is appreciably less for the case which forms the basis of the present invention because F varies as $\delta_2$ rather than as $\delta$. Accordingly the practice of the invention provides a line whose delay characteristics have been improved considerably.

On further examination of the use of both an inner and an outer shield in accordance with the invention, it will be seen that although the addition of the inner shield tends to lower the impedance, the attenuation of the line is not affected because at moderate frequencies current will flow on both the inside and outside of the coil, thus essentially providing two conductors in parallel. Moreover, the impedances with and without the inner shield approach one another at high frequencies and are lower than is the case at low frequencies (ultimately the impedance varies inversely with frequency). With an inner shield, the impedance falls from a lower initial low-frequency value and hence it does not change so much with increasing frequency. Neither, then, does the attenuation. At frequencies for which there is little skin effect in the wire, the attenuation will be increased by the presence of the inner shield. As the high frequency attenuation is not increased by the presence of the inner shield, this also means that there is less variation of attenuation with frequency when an inner shield is introduced in accordance with the invention.

The use of an inner shield may, in some instances, give rise to a fast mode of propagation because of interaction with the outer shield. This mode will have a low characteristic impedance, however, and it may be discriminated against by proper excitation. Additionally it is advantageous to connect the inner and outer shields together at both ends with impedances $Z_c$ equal to the characteristic impedance of the inner and outer shields in combination as a coaxial line, in the manner shown in Fig. 1.

It is to be understood that the above-described embodiment is illustrative of the principles of the invention. Similar arrangements can be devised by one skilled in the art without departing from the spirit and scope of this invention.

What is claimed is:

1. A delay line comprising an inner closed cylindrical conducting shield, a solenoid coil coaxial with and about said inner shield, an outer closed cylindrical conducting shield coaxial with and about said solenoid coil, and means having an impedance substantially equal to the characteristic impedance of the inner and outer shields as a coaxial line connected between said inner and outer shields.

2. A delay line comprising an inner closed cylindrical conducting shield, a solenoid coil wound coaxial with and along the length of said inner shield, an outer closed cylindrical conducting shield extending coaxial with and along the length of said solenoid coil, and impedance means substantially equal to the characteristic impedance of the inner and outer shields as a coaxial line connected between said inner and outer shields.

3. A delay line comprising an inner circularly cylindrical conducting shield, a solenoid coil coaxial with said inner shield, an outer circularly cylindrical conducting shield coaxial with said inner shield and coil, and means having an impedance which is substantially equal to the characteristic impedance of the inner and outer shields as a coaxial line connected between the inner and outer shields at each end.

4. A delay line comprising an inner circularly cylindrical conducting shield of outside radius $r_1$, a solenoid coil coaxial with said inner shield of mean radius $r_2$ and an outer circularly cylindrical conducting shield coaxial with said inner shield and coil of inner radius $r_3$ in which the radii $r_1$, $r_2$, and $r_3$ are such that the ratio $r_1/r_2$ is substantially equal to the ratio $r_2/r_3$.

5. A delay line comprising an inner circularly cylindrical conducting shield of outside radius $r_1$, a solenoid coil coaxial with said inner shield of mean radius $r_2$, and an outer circularly cylindrical conducting shield coaxial with said inner shield and coil of inner radius $r_3$, and impedance means substantially equal to the characteristic impedance of the inner and outer shields as a coaxial line connected between said inner and outer shields at each end, and further characterized in that the ratio $r_1/r_2$ is substantially equal to the ratio $r_2/r_3$.

JOHN R. PIERCE.

References Cited in the file of this patent

UNITED STATES PATENTS

| Number | Name | Date |
|---|---|---|
| 2,073,933 | Herbst | Mar. 16, 1937 |
| 2,503,955 | Lindenblad | Apr. 11, 1950 |